(12) United States Patent
Majumdar et al.

(10) Patent No.: US 12,450,048 B2
(45) Date of Patent: Oct. 21, 2025

(54) CONTAINERIZED APPLICATION MANAGEMENT

(71) Applicant: VMware LLC, Palo Alto, CA (US)

(72) Inventors: Anubhab Majumdar, Los Altos, CA (US); Harsh Kumar, Fremont, CA (US); George Hicken, San Francisco, CA (US)

(73) Assignee: VMware LLC, Palo Alto, CA (US)

( * ) Notice: Subject to any disclaimer, the term of this patent is extended or adjusted under 35 U.S.C. 154(b) by 697 days.

(21) Appl. No.: 17/893,957

(22) Filed: Aug. 23, 2022

(65) Prior Publication Data

US 2024/0069884 A1    Feb. 29, 2024

(51) Int. Cl.
*G06F 8/65*      (2018.01)
*G06F 9/455*     (2018.01)
*G06F 21/62*     (2013.01)

(52) U.S. Cl.
CPC .............. *G06F 8/65* (2013.01); *G06F 21/629* (2013.01)

(58) Field of Classification Search
CPC .. G06F 9/455; G06F 9/45533; G06F 9/45558; G06F 2009/45575; G06F 8/65; G06F 8/656; G06F 8/658
See application file for complete search history.

(56) References Cited

U.S. PATENT DOCUMENTS

| | | | |
|---|---|---|---|
| 10,042,628 B2* | 8/2018 | OlmstedThompson | ..................... H04L 41/0886 |
| 2016/0371105 A1* | 12/2016 | Sieffert | ................... G06F 8/656 |
| 2022/0292197 A1* | 9/2022 | Bandaru | ................... G06F 8/63 |

OTHER PUBLICATIONS

Sagar Nangare, "A Guide to Kubernetes Etcd: All You Need to Know to Setup Etcd Clusters" (Dec. 6, 2019), pp. 1-10 [retrieved from https://superuser.openinfra.org/articles/a-guide-to-kubernetes-etcd-all-you-need-to-know-to-set-up-etcd-clusters/]. (Year: 2019).*

* cited by examiner

*Primary Examiner* — Brian W Wathen
(74) *Attorney, Agent, or Firm* — King Intellectual Asset Management (57) ABSTRACT

A computer-implemented method, computer-readable medium and computer system to execute containerized applications includes initiating a Supervisor Cluster on top of a SDDC to support execution of containerized applications. A supervisor cluster namespace is created on the Supervisor Cluster. A storage policy is attached to the supervisor cluster namespace. Then, a control plane is bootstrapped, and containerized applications are executed in a virtual machine cluster using vSphere pods as the worker nodes in the virtual machine cluster.

20 Claims, 4 Drawing Sheets

CONTAINERIZED APPLICATION MANAGEMENT

TECHNICAL FIELD

This disclosure relates to computer virtualization involving encapsulating a physical computing machine platform into a virtual machine or virtual machines, and particularly to computer-implemented methods, computer-readable storage media and computer systems for containerized application management.

BACKGROUND

Kubernetes is an open-source system for automating deployment, scaling and management of containerized applications. Containerized applications are applications that run in isolated runtime environments called containers. Containers encapsulate an application with all its dependencies, including system libraries, binaries, and configuration files. Containerized applications are portable in that the application behaves consistently across different hosts. Containerized applications run on a host system and share the existing operating system (OS) provided by the host system.

A virtual machine (VM) is a compute resource implemented in software that abstracts resources (processor, memory, networking, etc.) of a physical computer to run programs and deploy apps. Each VM runs its own operating system and functions independently of the other VMs, even when they are all running on the same host. Whereas virtual machines virtualize an entire machine down to the hardware layers, containers only virtualize software layers above the OS level.

A Kubernetes cluster is a set of machines (nodes) for running containerized applications. Executing Kubernetes means executing a cluster. A cluster contains a control plane and one or more compute machines or nodes. The control plane maintains the desired state of the cluster, such as which applications are running and which container images they use.

In a Kubernetes system, containers are grouped into a logical unit called a pod. Containers in the same pod share the same resources and network, and maintain a degree of isolation from containers in other pods. The pods are distributed across nodes of the Kubernetes system and an image cache is provided on each node to speed up pod deployment. A node includes an OS, such as Linux®, and a container engine executing on top of the OS that supports the containers of the pod. Kubernetes control plane components (e.g., a kubelet) execute on the OS alongside the containers. Thus, a node includes multiple containers and control plane components executing on a shared OS.

A Tanzu Kubernetes Grid (TKG) is a one example of a substrate upon which Kubernetes clusters across software-defined data centers (SDDC) and public cloud environments can be deployed. A Kubernetes grid allows Kubernetes to be run with consistency as a utility that is readily available to developers.

A Kubernetes cluster that is deployed via the vSphere native management mechanisms is called a Supervisor Cluster. The Supervisor Cluster runs on top of an SDDC layer. As containerized workload and microservices became more popular, a workload control plane (WCP) on vSphere was introduced to allow running both VMs and container-based workloads on a single platform. WCP enables a Supervisor Cluster, which is an opinionated Kubernetes cluster. Users can run workloads directly on the Supervisor Cluster. Alternatively, users can deploy their own clusters in a supervisor name space and use that cluster instead. TKG allows running applications on conformant Kubernetes clusters, e.g., when the application has dependency on upstream feature not present or allowed in the Supervisor Cluster or when a user wants to upgrade the cluster independent of vSphere.

SUMMARY

This disclosure describes fast, and easy to use computer-implemented methods, computer-readable storage media and computer systems for containerized application management.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

This disclosure describes a computer system, computer-readable media and computer instructions for automating deployment, scaling and management of containerized applications that is quick to deploy and easy to use. The provisioning system described in this disclosure uses a low footprint control plane with fast on-demand pods that users can customize and deploy in a self-serve fashion without administrator credentials. The provisioning system offers a high resource density, suited to environments such as test/dev with high churn and high utilization. As described in detail below, the provisioning system deploys pods, which are faster to deploy and power-on compared to VMs, and consequently can scale up faster.

The provisioning system described in this disclosure leverages worker pods, which are supported natively by a Supervisor Cluster, which is a Kubernetes management cluster. Each worker pod (e.g., a vSphere pod) is a virtual machine with a small footprint that runs one or more containers. Each worker pod may be sized for the workload and may have explicit resource reservations for that workload. The worker pod allocates the exact amount of storage, memory, and CPU resources required for the workload to run. Compared to a traditional VM, a worker pod as described herein has short boot time, is optimized for running containers, is natively supported on a Supervisor Cluster, and has may have kernel bundled as part of the hypervisor.

Figure 1:
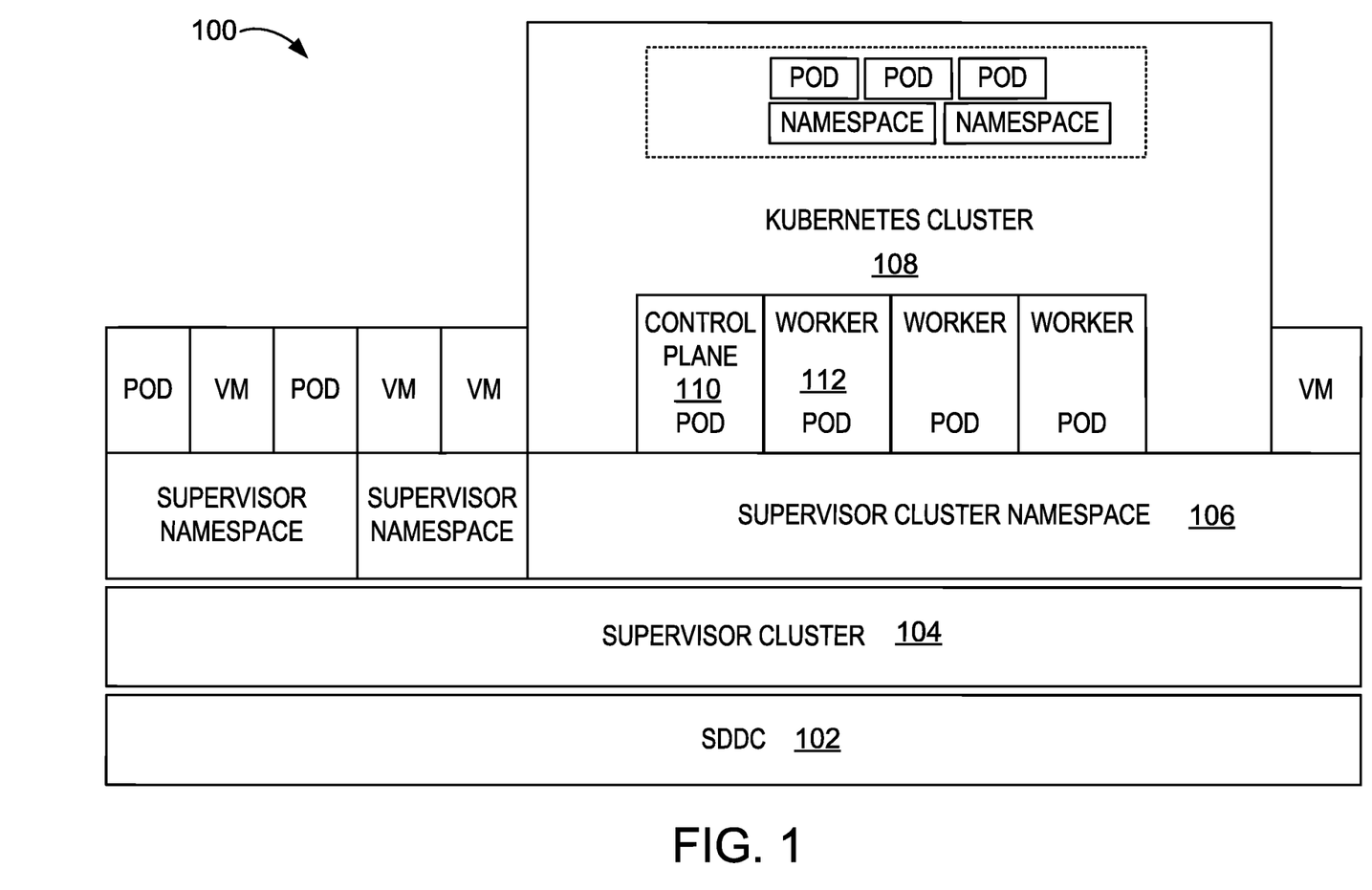
FIG. 1 is a schematic diagram of an example of a workload platform for a provisioning system.

FIG. 1 is an example of a workload platform for a provisioning system 100. The provisioning system 100 is implemented on a software-defined data center (SDDC) 102. The SDDC 102 is a computer-implemented architecture that enables a fully automated, zero-downtime infrastructure for an application and hardware. SDDC 102 comprises a set of hosts (e.g., server-grade computer hardware) system level virtualization software running on the hosts, and networking and storage resources. A Supervisor Cluster 104 is created and deployed on the SDDC 102 for workload management. The Supervisor Cluster 104 is bootstrapped by WCP using VMs. The VMs run etcd, Kubernetes software (api-server, kube-scheduler, etc.) and specific software, such as net-operator, authproxy, etc. Once enabled, an administrator can create namespaces and add storage/network to them, and assign DevOps users/groups. etcd is a strongly consistent, distributed key-value store that provides a reliable way to store data that needs to be accessed by a distributed system or cluster of machines. The Supervisor Cluster 104 can run worker pods, VMs and clusters inside namespaces.

Worker pods 112 can be used to bootstrap a highly available cluster 108 (e.g., a Kubernetes cluster) on top of a Supervisor Cluster 104. Since a pod is a core construct, no additional complexity need be added to the Supervisor Cluster 104 for running the provisioning system 100. Bootstrapping a new provisioning system 100 is as simple as applying a new Deployment specification with custom container images. The provisioning system 100 would reconcile and bring up the cluster 108 automatically. Scaling up the provisioning system 100 would be simply scaling up the Deployment. By using the worker pods 112, the deployment and scalability of the provisioning system 100 is increased without any resource utilization trade-offs. Worker pods 112 are highly optimized and only contain components necessary to efficiently run containers (e.g., containers 112).

Figure 2:
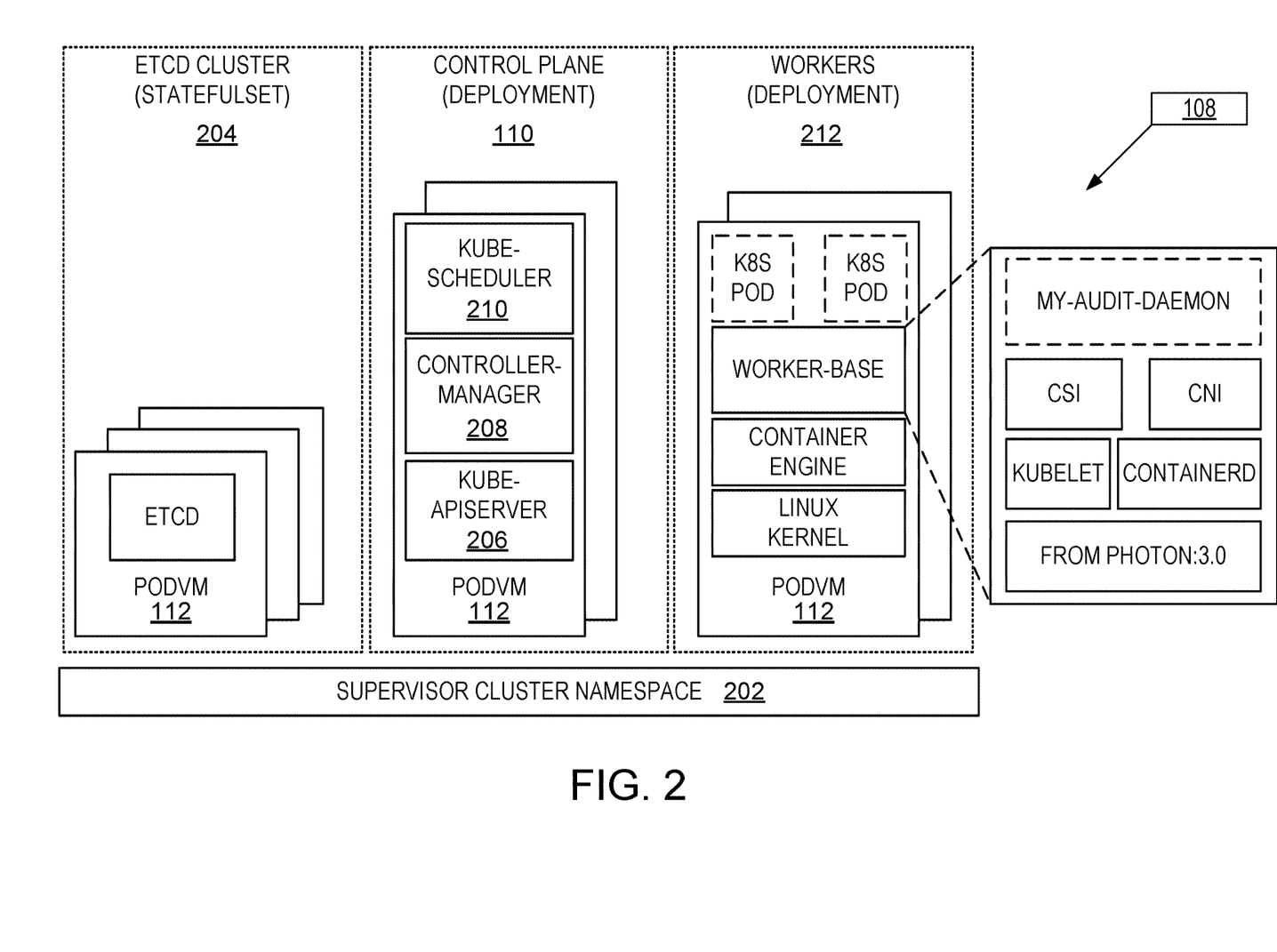
FIG. 2 is a schematic diagram of an example of the provisioning system of FIG. 1.

FIG. 2 is a schematic diagram of an example of the cluster 108 of FIG. 1. The cluster 108 operates using the worker pods ("PODVM") 112. Prior to deploying the cluster 108, the Supervisor Cluster 104 is enabled and in RUNNING state. A supervisor cluster namespace 202, which, for example, is a Namespace created on the Supervisor Cluster, is created and a storage policy is attached to the supervisor cluster namespace 202.

The cluster 108 is deployed by bootstrapping a highly available (HA) control plane 110. A HA control plane is one that can withstand certain degree of failure. For example, in one embodiment, the HA can withstand a failure of 1 out of 3 worker pods forming one or more compute resources, e.g., the etcd cluster 204. Details of such deployment are described in this and the following paragraphs. In some implementations, the deployment cluster 108 is deployed by starting an etcd cluster 204, specifically by running etcd inside the a worker pod 112. An etcd cluster is a strongly consistent, distributed key-value store that provides a reliable way to store data that needs to be accessed by a distributed system or cluster of machines. It gracefully handles leader elections during network partitions and can tolerate machine failure, even in the leader node. An upstream etcd container image can be used without any modification to run inside a worker pod 112. In some implementations, the cluster 108 runs three instances of the etcd in pods 112 to make the etcd cluster 204 highly available. For example, an etcd member can be run as a worker pod. Alternatively, multiple etcd members can be run as worker pods via Kubernetes ReplicaSet constructs such as Deployment or StatefulSet. The cluster 108 provides different workload API objects to maintain multiple instances of the same worker pod—Deployment, ReplicaSet, StatefulSet, etc. In some implementations, the provisioning system 108 implements the StatefulSet API object because etcd needs a stateful application.

The etcd cluster 204 persists etcd data on failure of an etcd instance. StatefulSet supports adding persistent storage using a storage class. A storage class with sufficient capacity is added to the Supervisor cluster namespace 202 when the provisioning system 108 is deployed. This same storage class is configured in the volumeClaimTemplates of the etcd StatefulSet specification to guarantee persistent storage in case of pod failure. The Persistent Volume and the Persistent Volume Claims for each of the instance is never deleted when pods are deleted. Consequently, the cluster can always be restored on disruption.

Also, etcd cluster 204 enables each etcd container to communicate with its peers. For etcd cluster to grow and maintain quorum, each node in the cluster 204 communicates with its peers. To do so, each etcd node is configured during startup with a discovery service (not shown). For example, each etcd node publishes its URL to this service and other nodes can query the service to get peer URLs. Alternatively, each etcd node may be configured with a fixed URL for its peers. StatefulSet provides fixed identifiers for each of its replicas. The provisioning system 108 combines this feature with a headless service named etcd to construct fixed URLs for each of the etcd node in the StatefulSet spec. An example is shown in Table 1, which shows pseudocode representing the URL of each etcd node ( ) in LTKG.

TABLE 1

PEERS=etcd-0=https://etcd-0.etcd.${
    NAMESPACE}.cluster.local:2380,etcd-1=https://etcd
    -1.etcd.${NAMESPACE}.cluster.local:2380,etcd-2=
    https://etcd-2.etcd.${NAMESPACE
    }.cluster.local:2380;

Control plane 110 includes a minimalist control plane including an API server 206 (e.g., kube-apiserver), a scheduler 210 (e.g., kube-scheduler) and a controller-manager 208. The API server is a component of control plane 110 and exposes the Kubernetes API. Scheduler 210 is a control plane component that watches for newly created pods with no assigned node and selects a node for them to run on. Controller-manager 208 is a control plane component that runs controller processes. Although each component is a separate process, they are all compiled into a single binary and run in a single process to reduce complexity. Control plane 110 may use container images of all three components from upstream without modification for bootstrapping, i.e., for system configuration and deployment. In some implementations, the control plane 110 houses the three container images in a single worker pod (e.g., named "consolidated"). Other variations are possible, such as all control plane containers being run as a single process within a single container. The Kubernetes distro "k3s" is an example of this approach.

The cluster state is maintained in etcd. Consequently, the pod that houses the three containers can be stateless. This allows using a single replica of consolidated. Because a HA etcd cluster has been setup, more than one replica need not be run, in case the pod fails. The provisioning system 104 can simply deploy a new pod, which would continue working using the state maintained in etcd.

To access control plane 110, deployment cluster 108 can include a service to target a port of the consolidated pod. Once the consolidated pod is in RUNNING state, the service IP can be used to reach API server 206. To reach the deployment cluster 108 from within the supervisor cluster 104, service of type ClusterIP is sufficient. To access the deployment cluster 108 from a client network outside the supervisor cluster 104, a service of type LoadBalancer (LB) can be created. Setting up the LB can enable the supervisor cluster 104. By using the correct server address in the config file, users can start interacting with the deployment cluster 108.

The deployment cluster 108 implements worker nodes 212, which are compute entities where the deployment cluster 108 runs customer pods. The deployment system 108 can use worker pods 112 as worker nodes 212 by modifying each worker pod 112 as described below. Spherelet-agent is updated to give Read/Write cgroup permissions to privileged containers running inside worker pods 112. This is needed to be able to run kubelet and containerd (container runtime) as containers inside a Worker pod 112. A spherelet is a process created on each host. It is a kubelet that is ported natively to ESXi and allows the ESXi host to become part of the Kubernetes® cluster. Spherelet-agent is also updated to mount additional devices and/dev paths for privileged containers. This is needed to be able to run nodes that handle persistent volume node attachment as container inside a Worker pod 112. The worker pods 112 provides bundles and loads only a minimum set of linux kernel modules, which is not sufficient to run kube-proxy, iptables (for cluster IP routing) and calico (overlay networking). Therefore, these kernel modules are bundled as part of the Worker Node container image and loaded at the time that the worker node 212 is initialized. This is required so that the kubelet and container runtime can configure cgroups for nested containers that are managed. A privileged container is a container that needs higher privileges (permissions) to correctly run.

Kernel module kube-proxy is deployed after the worker node 212 is added to the cluster. Kube-proxy is a Kubernetes software component that acts as a network proxy for address translation and helps support cluster networking in Kubernetes cluster. Kube-proxy runs as a Kubernetes Daemonset because one instance of kube-proxy needs to run on each worker node. Kubeadm can be used to configure add kube-proxy by passing the kubeconfig file and DNS name of consolidated service as a parameter to kubeadm. Kubeadm is a publicly available tool that can be used to set up a Kubernetes cluster easily with few manual steps. A kubeconfig file is a configuration file with cluster-specific information (IPs, network subnet, security keys, etc.) and is passed to kubeadm. Calico is used to provide cluster networking in the deployment cluster 108. Upstream calico image can be used without modification.

The deployment cluster 108 implements CoreDNS as DNS server. Because the deployment cluster 108 is a standard vanilla cluster, upstream deployment specifications can be applied with minor modification to start running CoreDNS. CoreDNS is publicly available DNS software that can be used in different environments due to its flexibility. A vanilla cluster is able to run upstream software without modifications. Deployment cluster 108 may implement two replicas of the CoreDNS pod and sets a fixed ClusterIP for the CoreDNS service to pass the service ClusterIP to kubelet as a startup flag (-cluster-dns), which, in turn, passes this to containers for DNS resolution. ClusterIP is a Kubernetes-specific construct. Kubernetes allows creation of "Service" that maps to one or more pods. The services can be of different types, one of them being ClusterIP, which is an IP address that is reachable only inside the Kubernetes cluster. For example, API server 206 can reach the CoreDNS service using the ClusterIP, but a user cannot access the Internet using the same IP.

Figure 4:
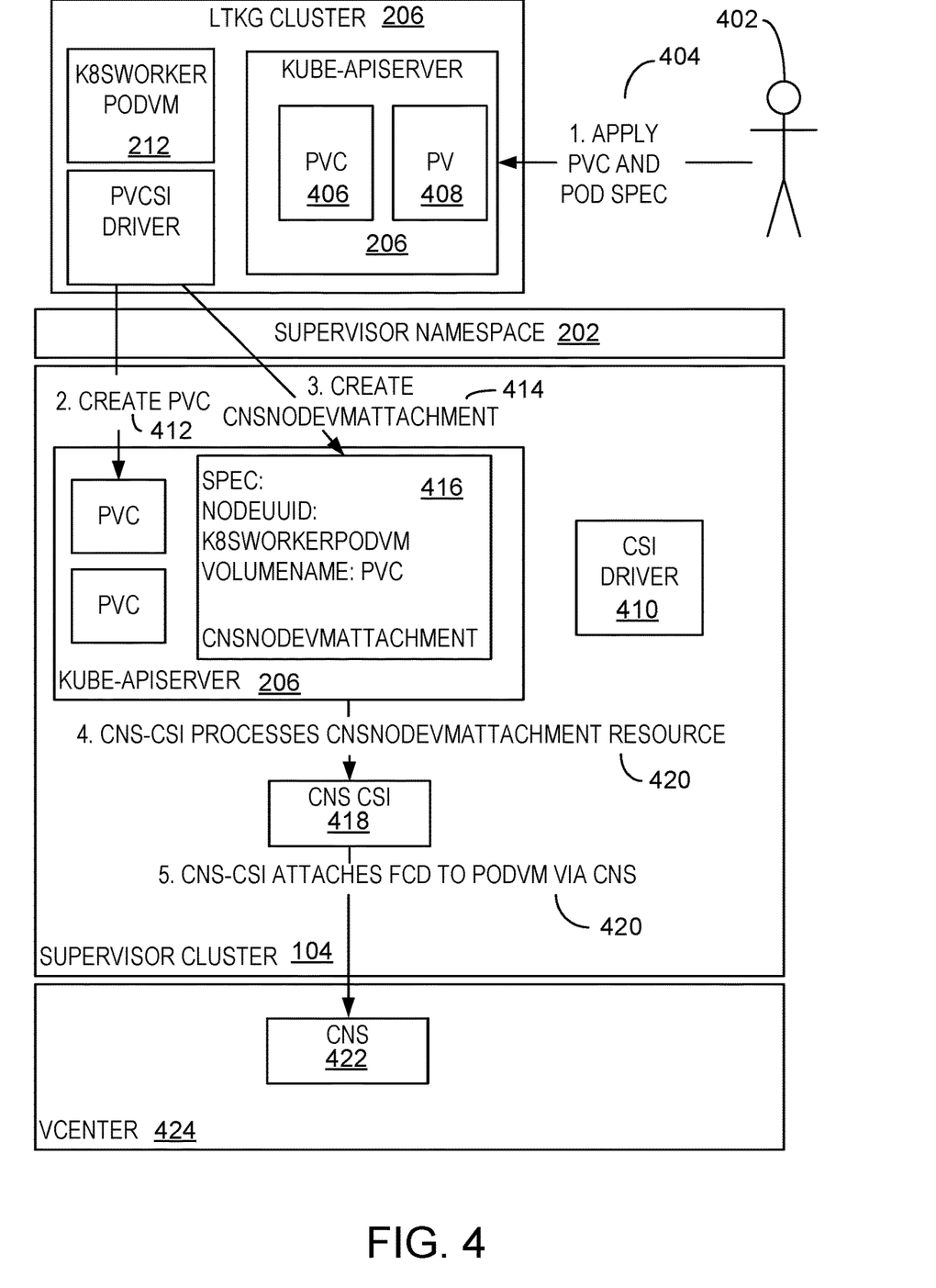
FIG. 4 is a schematic diagram of an example of container storage interface (CSI) support in the provisioning system of FIG. 1.

FIG. 4 is a schematic diagram of an example of container storage interface (CSI) support in the cluster 108. The cluster 108 uses a paravirtual CSI (pvCSI) model to provide support for persistent volume and persistent volume claims. FIG. 4 shows the workflow that the cluster 108 use to support storage. A DevOps user 402 applies (step 404) a pod specification 404 that references a persistent volume claim (PVC) 406. Once the PVC 406 in Supervisor Cluster 104 is successfully bound to a persistent volume (PV) 408, the ControllerPublishVolume (not shown) function of CSI driver 410 is invoked, which attaches a volume to the worker pod 212. This is achieved by creating (step 414) a Cns-NodeVmAttachment object 416, which is an API object in Supervisor Cluster 104. In some implementations, the Cns-NodeVmAttachment spec is as shown in Table 2.

TABLE 2 apiVersion: cns.vmware.com/v1alpha1
kind: CnsNodeVmAttachment
...
spec:
   nodeuuid: <worker pod UUID>
   volumename: <Supervisor PVC Name>

Here, the nodeuuid is the universally unique identifier (UUID) of the worker pod 112 that is masquerading as the deployment worker node on which the pod is scheduled. The volumename is the name of the PVC created by the CSI driver 410 in Supervisor Cluster 104. Supervisor cluster 104 houses the CNS-CNSI operator 418 that processes the CnsNodeVmAttachment (step 420) created by the CSI driver 410 by provisioning a First Class Disk (FCD). CNS-CSI operator 418 attaches the FCD to the worker pod (step 420) via CNS 422 in vCenter 424. The FCD is a virtual disk with lifecycle management independent of the VMs to which the FCD is attached.

Figure 3:
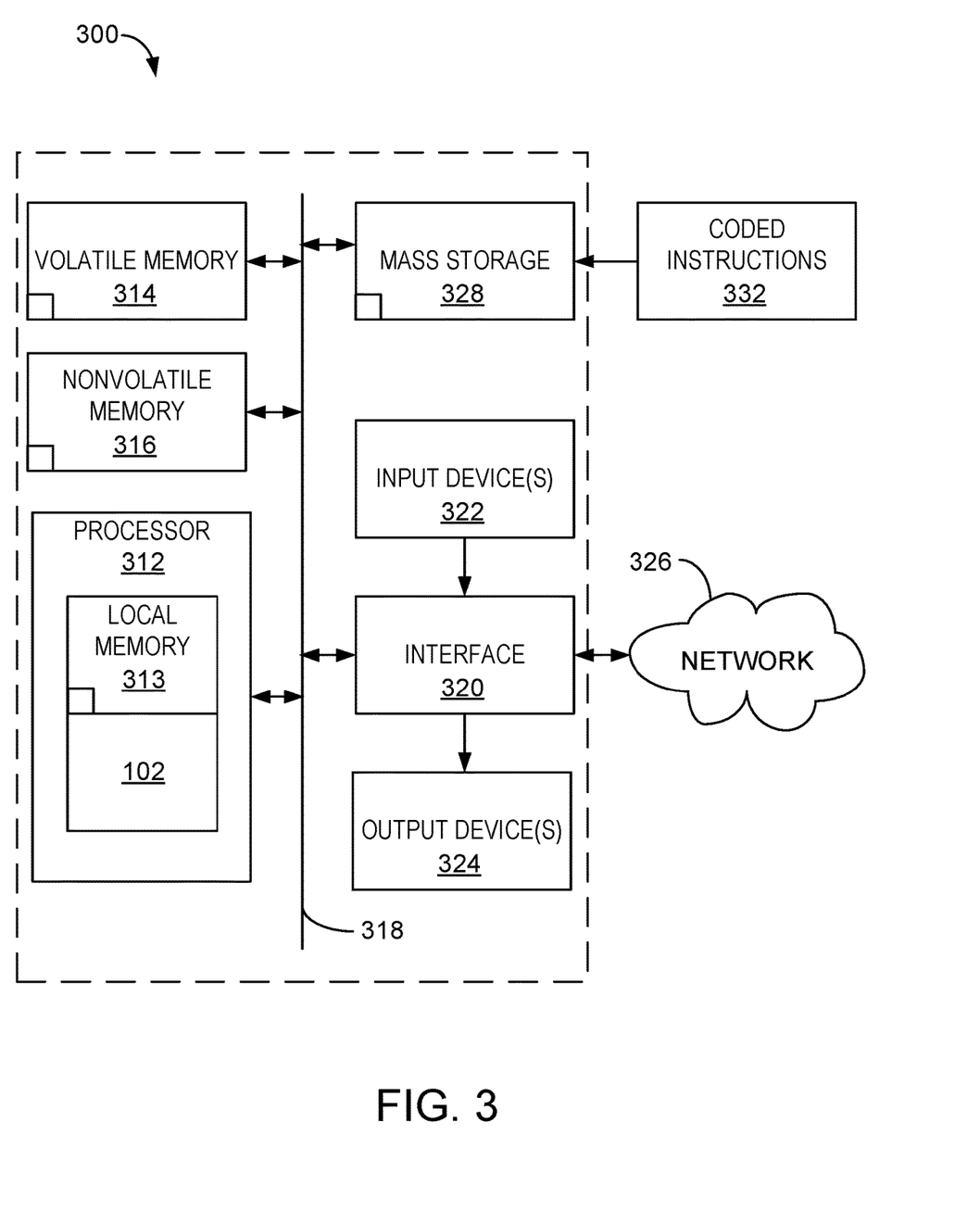
FIG. 3 is a block diagram of an example of a processing platform.

FIG. 3 is a block diagram of an example of a processing platform 300 configured to execute the techniques described in this disclosure, specifically, the methods described above with reference to FIGS. 1 and 2. The processor platform 300 can be, for example, a server, a personal computer, a workstation, a self-learning machine (e.g., a neural network), a mobile device (e.g., a cell phone, a smart phone, a tablet computer), a personal digital assistant (PDA), an Internet appliance, or any other type of computing device. In some implementations, the processor 312 implements the components shown in FIG. 1, especially, the manager 102.

The processor platform 300 includes a processor 312, which is hardware. For example, the processor 312 can be implemented by one or more integrated circuits, logic circuits, microprocessors, graphics processing units (GPUs), digital signal processors (DSPs), or controllers. The hardware processor 312 can be a semiconductor, e.g., silicon, based device. The hardware processor 312 can implement the components of the systems (for example, system 100, system 700) described with reference to FIGS. 1 and 2.

The processor 312 includes a local memory 313 (e.g., a cache). The process 312 is in communication with a main memory including a volatile memory 314 and a non-volatile memory 316 via a bus 318. The volatile memory 314 can be implemented by synchronous dynamic random access memory (SDRAM), dynamic random access memory (DRAM) or other type of random access memory device. The non-volatile memory 316 can be implemented by flash memory and/or any other desired type of memory device. A memory controller controls access to the main memory 314, 316.

The process platform 300 also includes an interface circuit 320 implemented by any type of interface standard, for example, an Ethernet interface, a universal serial bus (USB), a wired or wireless interface, a near field communication (NFC) interface and/or a PCI express interface. One or more input devices 322 are connected to the interface circuit 320. The input devices permit a user to enter data and/or commands to the processor 312. The input devices can be implemented by, for example, an audio sensor, a microphone, a camera (still or video), a keyboard, a button, a mouse, a touchscreen, a track-pad, a trackball, isopoint and/or a voice recognition system.

One or more output devices 324 are also connected to the interface circuit 320. The output devices 324 can be implemented, for example, by display devices, e.g., light emitting diode (LED), an organic LED (OLED), a liquid crystal display (LCD), a cathode ray tube display (CRT), an in-place switching (IPS) display, a touchscreen, etc. and/or a tactile output device, a printer and/or speaker. The interface circuit 320 typically includes a graphics driver card, a graphics driver chip and/or a graphics driver processor.

The interface circuit 320 also includes a communication device such as a transmitter, a receiver, a transceiver, a modem, a residential gateway, a wireless access point, and/or a network interface to facilitate exchange of data with external machines (e.g., computing devices of any kind) via a network 326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 300 also includes one or more mass storage devices 328 for storing software and/or data. Examples of such mass storage devices 328 include floppy disk drives, hard disk drives, compact disk drives, redundant array of independent disks (RAID) systems, digital versatile disk (DVD) drives, or combinations of them.

Machine executable instructions 332 represented by the flowchart of FIG. 3 can be stored in the mass storage device 328, in the volatile memory 314, in the non-volatile memory 316, and/or on a removable non-transitory computer readable storage medium such as a CD or DVD.

Certain aspects of the subject matter described here can be implemented as a computer-implemented method to execute containerized applications. The method is deployed in a virtualized environment configured to create Kubernetes clusters having a Kubernetes management cluster. The Kubernetes management cluster is configured to support execution of the containerized applications. Before executing the containerized applications in the Kubernetes cluster using worker pods, each worker is modified. An OS management component for each worker pod is updated to give Read/Write cgroup permissions to privileged containers running inside each worker pod. The OS management component is updated to mount additional devices and/dev paths for privileged containers. Kernel modules of each worker pod are bundled as part of a container image of each worker node in each worker pod.

An aspect combinable with any other aspect includes the following features. The Kubernetes management cluster is initiated in the virtualized environment configured to create the nested Kubernetes clusters. The Kubernetes management cluster includes load balanced control planes. A namespace on the Kubernetes management cluster is created. The namespace on the Kubernetes management cluster includes a combination of resource allocations and permissions set within the Kubernetes management cluster. To create the namespace on the Kubernetes management cluster, role-based access controls are assigned and virtual resources backed by a physical system are allocated. A storage policy is attached to the namespace on the Kubernetes management cluster. After attaching the storage policy to the namespace on the Kubernetes management cluster, a control plane is bootstrapped. After bootstrapping the control plane, containerized applications are executed in the nested Kubernetes clusters using virtual machine-backed worker pods as the worker nodes in the Kubernetes cluster.

An aspect combinable with any other aspect includes the following features. Before executing the containerized applications in the virtual machine cluster using vSphere pods, each vSphere pod is modified. To do so, a spherelet-agent in each vSphere pod is updated to give Read/Write cgroup permissions to privileged containers running inside each vSphere pod. The spherelet-agent is updated to mount additional devices and/dev paths for privileged containers. Kernel modules of each vSphere pod are bundled as part of a container image of each worker node in each vSphere pod.

An aspect combinable with any other aspect includes the following features. To bootstrap the control plane, one or more instances of compute resources are deployed by running etcd inside a worker pod.

An aspect combinable with any other aspect includes the following features. To run the etcd inside the worker pod, three instances of the etcd are run inside the worker pod.

An aspect combinable with any other aspect includes the following features. To run the etcd inside the worker pod, etcd data is persisted on failure. An etcd container that stores the etcd data is enabled to communicate with peer etcd containers that store respective etcd data.

An aspect combinable with any other aspect includes the following features. To persist the etcd data on failure, a storage class with sufficient capacity to persist the etcd data is added to the Kubernetes management namespace.

An aspect combinable with any other aspect includes the following features. To enable the etcd container to communicate with peer etcd containers, a uniform resource locator of the etcd container is published to allow the per etcd containers to query during startup.

An aspect combinable with any other aspect includes the following features. To enable the etcd container to communicate with peer etcd containers, a fixed uniform resource locator is established for the peer containers.

Certain aspects of the subject matter described in this disclosure can be implemented as a system that includes one or more processors including a hardware-based processor, and a memory storage including a non-transitory computer-readable medium storing instructions which, when executed by the one or more processors including the hardware-based processor, to perform operations including the methods described in this disclosure.

While this specification contains many specific implementation details, these should not be construed as limitations on the scope of any implementation or on the scope of what may be claimed, but rather as descriptions of features that may be specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In certain implementations, multitasking and parallel processing can be advantageous.

What is claimed is:

1. A computer-implemented method to execute containerized applications, the method comprising:
   in a virtualized environment configured to create nested Kubernetes clusters having a Kubernetes management cluster configured to support execution of the containerized applications, before executing the containerized applications in the Kubernetes cluster using worker pods, modifying each worker pod by:
   updating an OS management component for each worker pod to give Read/Write cgroup permissions to privileged containers running inside each worker pod;
   updating the OS management component to mount additional devices and/dev paths for privileged containers; and
   bundling kernel modules of each worker pod as part of a container image of each worker node in each worker pod.

2. The computer-implemented method of claim 1, further comprising executing the containerized applications by:
   initiating the Kubernetes management cluster in the virtualized environment configured to create the nested Kubernetes clusters, wherein the Kubernetes management cluster comprises load balanced control planes;
   creating a namespace on the Kubernetes management cluster on the Kubernetes management cluster, wherein the namespace on the Kubernetes management cluster comprises a combination of resource allocations and permissions set within the Kubernetes management cluster, wherein creating the namespace on the Kubernetes management cluster comprises assigning role-based access controls and allocating virtual resources backed by a physical system;
   attaching a storage policy to the namespace on the Kubernetes management cluster;
   after attaching the storage policy to the namespace on the Kubernetes management cluster, bootstrapping a control plane; and
   after bootstrapping the control plane, executing the containerized applications in the nested Kubernetes clusters using virtual machine-backed worker pods as the worker nodes in the Kubernetes cluster.

3. The computer-implemented method of claim 2, wherein bootstrapping the control plane comprises deploying one or more instances of compute resources by running etcd inside a worker pod.

4. The computer-implemented method of claim 3, wherein running the etcd inside the worker pod comprises running three instances of the etcd inside the worker pod.

5. The computer-implemented method of claim 3, wherein running the etcd inside the worker pod comprises:
   persisting etcd data on failure; and
   enabling an etcd container that stores the etcd data to communicate with peer etcd containers that store respective etcd data.

6. The computer-implemented method of claim 5, wherein persisting the etcd data on failure comprises adding a storage class with sufficient capacity to persist the etcd data to the namespace on the Kubernetes management cluster.

7. The computer-implemented method of claim 5, wherein enabling the etcd container to communicate with peer etcd containers comprises publishing a uniform resource locator of the etcd container to allow the peer etcd containers to query during startup.

8. The computer-implemented method of claim 5, wherein enabling the etcd container to communicate with peer etcd containers comprises establishing a fixed uniform resource locator for the peer containers.

9. A non-transitory computer-readable medium storing instructions which, when executed by a hardware-based processor, performs operations comprising:
   in a virtualized environment configured to create nested Kubernetes clusters having a Kubernetes management cluster configured to support execution of the containerized applications, before executing the containerized applications in the Kubernetes cluster using worker pods, modifying each worker pod by:
   updating an OS management component for each worker pod to give Read/Write cgroup permissions to privileged containers running inside each worker pod;
   updating the OS management component to mount additional devices and/dev paths for privileged containers; and
   bundling kernel modules of each worker pod as part of a container image of each worker node in each worker pod.

10. The medium of claim 9, wherein the operations further comprise executing the containerized applications by:
   initiating the Kubernetes management cluster in the virtualized environment configured to create the nested Kubernetes clusters, wherein the Kubernetes management cluster comprises load balanced control planes;
   creating a namespace on the Kubernetes management cluster on the Kubernetes management cluster, wherein the namespace on the Kubernetes management cluster comprises a combination of resource allocations and permissions set within the Kubernetes management cluster, wherein creating the namespace on the Kubernetes management cluster comprises assigning role-based access controls and allocating virtual resources backed by a physical system;
   attaching a storage policy to the namespace on the Kubernetes management cluster;
   after attaching the storage policy to the namespace on the Kubernetes management cluster, bootstrapping a control plane; and
   after bootstrapping the control plane, executing the containerized applications in the nested Kubernetes clusters using virtual machine-backed worker pods as the worker nodes in the Kubernetes cluster.

11. The medium of claim 10, wherein bootstrapping the control plane comprises deploying one or more instances of compute resources by running etcd inside a worker pod.

12. The medium of claim 11, wherein running the etcd inside the worker pod comprises running three instances of the etcd inside the worker pod.

13. The medium of claim 11, wherein running the etcd inside the worker pod comprises:
persisting etcd data on failure; and
enabling an etcd container that stores the etcd data that stores the etcd data to communicate with peer etcd containers that store respective etcd data.

14. The medium of claim 13, wherein persisting the etcd data on failure comprises adding a storage class with sufficient capacity to persist the etcd data to the namespace on the Kubernetes management cluster.

15. The medium of claim 13, wherein enabling the etcd container to communicate with peer etcd containers comprises publishing a uniform resource locator of the etcd container to allow the peer etcd containers to query during startup.

16. The medium of claim 13, wherein enabling the etcd container to communicate with peer etcd containers comprises establishing a fixed uniform resource locator for the peer containers.

17. A system comprising:
one or more processors including a hardware-based processor; and
a memory storage including a non-transitory computer-readable medium storing instructions which, when executed by the one or more processors including the hardware-based processor, performs operations comprising:
in a virtualized environment configured to create nested Kubernetes clusters having a Kubernetes management cluster configured to support execution of the containerized applications, before executing the containerized applications in the Kubernetes cluster using worker pods, modifying each worker pod by:
updating an OS management component for each worker pod to give Read/Write cgroup permissions to privileged containers running inside each worker pod;
updating the OS management component to mount additional devices and/dev paths for privileged containers; and
bundling kernel modules of each worker pod as part of a container image of each worker node in each worker pod.

18. The system of claim 17, wherein the operations further comprise executing the containerized applications by:
initiating the Kubernetes management cluster in the virtualized environment configured to create the nested Kubernetes clusters, wherein the Kubernetes management cluster comprises load balanced control planes;
creating a namespace on the Kubernetes management cluster on the Kubernetes management cluster, wherein the namespace on the Kubernetes management cluster comprises a combination of resource allocations and permissions set within the Kubernetes management cluster, wherein creating the namespace on the Kubernetes management cluster comprises assigning role-based access controls and allocating virtual resources backed by a physical system;
attaching a storage policy to the namespace on the Kubernetes management cluster;
after attaching the storage policy to the namespace on the Kubernetes management cluster, bootstrapping a control plane; and
after bootstrapping the control plane, executing the containerized applications in the nested Kubernetes clusters using virtual machine-backed worker pods as the worker nodes in the Kubernetes cluster.

19. The system of claim 18, wherein bootstrapping the control plane comprises deploying one or more instances of compute resources by running etcd inside a worker pod.

20. The system of claim 19, wherein running the etcd inside the worker pod comprises running three instances of the etcd inside the worker pod.

\* \* \* \* \*